UNITED STATES PATENT OFFICE 1,999,146

METHOD OF INCREASING THE PRODUCTION OF WELLS

Henry A. Ambrose and Albert G. Loomis, Pittsburgh, Pa., assignors to Gulf Research & Development Corporation, Wilmington, Del., a corporation of Delaware No Drawing. Application June 25, 1934, Serial No. 732,352

6 Claims. (Cl. 166—21)

This invention relates to methods of increasing the production of wells; and it comprises a method of treating wells for the removal of matter obstructing the flow of liquids, wherein chlorin is introduced into the well in gas or liquid form and is allowed to act on the obstructing matter and the well is flushed; all as more fully hereinafter set forth and as claimed.

Wells, particularly oil and gas wells, decrease in production in the course of time. In many cases, the decrease is due not to actual exhaustion of the well but to other causes. In the case of oil and gas wells, decreasing productivity is usually due to one or more of several causes. The gas pressure in or adjacent the well may fall. Solid or gummy matter may be carried into the well by oil or water flows and be deposited on the walls; the oil may deposit paraffin or wax, for example, on the bore walls. A well may have a low rate of production on account of clogging caused by the drilling muds used when drilling the well. And, finally, the pores and crevices of the producing formation may become clogged by precipitation of mineral deposits from water in the well. Calcium carbonate is deposited on the well walls from water containing calcium bicarbonate. This last phenomenon is particularly serious in wells sunk in limestone strata, and it alone may decrease production of a well below economical limits.

Methods, both mechanical and chemical, have been proposed for treating wells to remove clogging and to increase production. Mechanical methods usually comprise blasting; a charge of explosive is fired in the well bottom to shatter the walls and open up new flow crevices. Various chemical treatments have been proposed. One which is particularly advantageous and which has come into wide use is treatment with hydrochloric acid. This treatment was first proposed in the Frasch Patent No. 556,669 of March 17, 1896. Hydrochloric acid treatment is particularly effective in the case of wells sunk through limestone strata.

There are, however, disadvantages attending the use of hydrochloric acid or other similar strong aqueous acid in well treatment, particularly when the well contains tubing or casing in place. Hydrochloric acid is very aggressive, and attacks the casing and other metal parts of the well unless inhibitors are provided. The rate of reaction of hydrochloric acid is high; the acid necessarily becomes neutralized before it can travel any great distance into the strata under treatment. The quantity of acid sufficient for adequate chemical treatment is a comparative small volume. An average dose of 1000 gallons has a volume of only about 134 cubic feet. Such small volumes are difficult to localize in the well horizon (i. e. level) under treatment, without waste.

The achieved object of the present invention is to provide a method of well treatment which has all the advantages of hydrochloric acid treatment—the best method hitherto known—with certain additional advantages, while avoiding the inherent disadvantages of hydrochloric acid treatment.

According to the invention, we provide for the treatment of clogged wells with chlorin, in the presence of water. We have found that chlorin gas in contact with limestone attacks the limestone aggressively. The resulting highly water-soluble chlorids may be readily removed by a flushing with water. When the dissolved matter is flushed away, the limestone formation is found to be much more permeable; resistance to flow of fluid through it is considerably decreased. The attack by chlorin is effective whether the limestone be saturated with oil or water, or both. The presence of water is desirable but is not essential. A sample of limestone saturated with oil is appreciably attacked by chlorin gas even in the absence of liquid water; but attack is more rapid when water is present. Moist limestone in the absence of oil is effectively attacked and, as in the other cases, the reaction products are readily removed by a water wash.

As examples illustrating the effect of chlorin on oil field limestones, chlorin gas was passed through a core sample of limestone obtained from an oil well, for a period of one-half hour. The relative permeability of the rock was increased from 0.95 to 8.6. Another sample of oil field limestone, saturated with oil and water, was treated with chlorin gas for 7¾ hours, at the end of which time it had lost 4.25 per cent of its weight and had become highly permeable.

In practicing the invention, chlorin is introduced into the well in one of several ways. Unless the strata to be treated are at the bottom of the well, the well is first plugged off or filled, in one of the ways known in the art, just below the level to be treated. Liquid chlorin may be poured down the tubing and allowed to vaporize in the well under its own pressure. A better way is to close off the well, attach a cylinder of chlorin to the tubing head and allow the chlorin to vaporize into the well from the cylinder. Chlorin, being much denser than air, sinks into the well without much diffusion and the pressure of the liquid chlorin in the cylinder carries chlorin gas into the rock strata.

Water or steam may be introduced at the same time as the chlorin, or before or after the introduction of the chlorin. Such introduction is usually advisable unless there is a flow of water naturally present in the well. In the case of wells it is advantageous to introduce water simultaneously with the chlorin. Oil wells generally comprise an outer casing and an inner string of tubing more or less concentric with the casing. In treating the well it is advantageous to introduce the chlorin into the tubing, while keeping the tubing as dry as possible, and injecting the water or steam between the tubing and the casing. The water flushes away the chlorids formed by the reaction of chlorin on the deposit, and serves to keep the face of the formation under treatment exposed and free from oil. If the well is producing oil and water concurrently, from the same strata, the flushing flow of water may be omitted. The principal function of the water flow is to keep the bore walls clean and to dissolve and remove the products of reaction, which usually comprise chlorids of calcium, magnesium and iron.

We have found that there is advantage to be gained in practice by employing a chemical reagent which occupies a large volume in the formation under treatment. Chlorin has this advantage. One gallon of liquid chlorin is chemically equivalent to about four gallons of 20° Bé. hydrochloric acid; the usual strength for well treatment work. Liquid chlorin vaporizes completely when exposed to usual well temperatures and pressures. Assuming that the pressure existing in the well horizon under treatment is 50 pounds per square inch and the temperature 100° F., one gallon of liquid chlorin on vaporizing occupies approximately 19.7 cubic feet. A gallon of liquid is only 0.13 cubic feet. An average well treatment, using hydrochloric acid, may use about 1000 gallons of diluted acid comprising, say, 500 gallons of 20° Bé. hydrochloric acid. This quantity of hydrochloric acid is equivalent chemically to about 125 gallons of liquid chlorin. One thousand gallons of acid is only 134 cubic feet; but 125 gallons of liquid chlorin vaporize at a pressure of 50 pounds per square inch and a temperature of 100° F. to fill a volume of about 2460 cubic feet. The expanding gaseous chlorin penetrates more generally and thoroughly into the formation adjacent the bore walls under treatment, than does a chemically equivalent amount of liquid reagent.

In a specific example of our invention applied to an oil well, a well producing oil at the rate of one barrel a day and having a bottom hole pressure of 50 pounds per square inch and a bottom hole temperature of 100° F., is treated with chlorin to increase the production. The well is producing 5 barrels of water daily along with the oil and through the same drainage channels in the well. No additional water need be supplied with the chlorin. Before treatment the well is pumped as nearly dry as possible and the pump and sucker rods are pulled. The casing head is closed and the chlorin introduced from commercial chlorin cylinders connected with the tubing head by means of standard fittings, a pressure gauge being included in the chlorin line. If desired several tanks of chlorin may be connected to a common header and emptied at the same time. At 80° F. liquid chlorin exerts a pressure of 116 pounds per square inch. Chlorin enters the well under its own pressure. A charge of 35 gallons of chlorin is usually sufficient. The oil and water formation take the gas and as soon as the cylinders are emptied the pressure drops due to expansion of the gas. The tubing head is closed and the well allowed to stand idle for several days. At the end of this period the pumping equipment is replaced in the tubing and pumping resumed. The pump brings up oil admixed with water containing a considerable quantity of chlorids in solution, the chlorids representing obstructing matter dissolved out by the chlorin. The effective permeability of the producing formation is increased about ten times and the production is also increased ten times.

In wells in which oil and water are produced from independent strata or in which only oil is produced water or steam may be introduced into the casing at the same time that chlorin is being introduced through the tubing, or afterwards.

Well pressures in old wells or wells of diminished production are usually quite low. Liquid chlorin at a temperature of only 80° F., which is lower than that obtaining in most wells, exerts a pressure of 116 pounds per square inch, which is usually in excess of bottom hole pressures in such low producing wells. In treating high pressure wells, the liquid chlorin may be heated to raise its vapor pressure, or chlorin may be introduced into the well in water solution under pressure.

Our method is suitable for application to any clogged well; wells in all sorts of terrains and producing oil, gas or water. It is particularly useful in treating wells in limestone strata, or which are sunk through limey sands or sands which have been mudded with calcareous drilling muds.

Economically, the method presents many advantages over hitherto known treatments. One gallon of liquid chlorin is chemically equivalent to 4 gallons of 20° Bé. hydrochloric acid, but costs less and is more economically shipped.

What we claim is:

1. The method of increasing the production of wells which comprises removing matter obstructing flow of fluids into the well by introducing chlorin into the well adjacent the obstructing matter and in the presence of water, whereby the obstructing matter is attacked, the attacked obstructing matter being removed from the well.

2. The method of increasing the production of wells which comprises removing matter obstructing flow of fluids into the well by introducing chlorin into the well adjacent the obstructing matter and in the presence of water, and flushing with water the portion of the well under treatment.

3. The method of increasing the production of wells which comprises removing matter obstructing flow of fluids into the well by introducing chlorin into the well in water solution, whereby the obstructing matter is attacked, the attacked obstructing matter being removed from the well.

4. The method of increasing the production of wells which comprises removing matter obstructing flow of fluids into the well by introducing gaseous chlorin into the well under pressure and allowing it to expand into the strata adjacent the well walls, whereby obstructing matter is attacked by the chlorin, and removing the attacked obstructing matter from the well.

5. The method of increasing the production of wells which comprises removing matter obstructing flow of fluids into the well by introducing gaseous chlorin into the well, allowing it to expand into the strata adjacent the well walls, whereby obstructing matter is attacked, and flushing out attacked obstructing matter by a flow of water.

6. The method of increasing the production of wells having an outer casing and an inner tubing which comprises removing matter obstructing flow of fluids into the well by introducing chlorin into the well adjacent the obstructing matter through the tubing and introducing water into the well between the casing and the tubing.

HENRY A. AMBROSE.
ALBERT G. LOOMIS.